US012126382B2

(12) United States Patent
Padmaraju et al.

(10) Patent No.: US 12,126,382 B2
(45) Date of Patent: Oct. 22, 2024

(54) OPTIMIZATION OF RF DRIVER AND/OR OPTICAL DEVICE

(71) Applicant: Nokia Solutions and Networks Oy, Espoo (FI)

(72) Inventors: Kishore Padmaraju, New York, NY (US); Bernd-Harald Horst Juergen Rohde, Munich (DE); Matthew Streshinsky, Taos, NM (US)

(73) Assignee: Nokia Solutions and Networks Oy, Espoo (FI)

( * ) Notice: Subject to any disclaimer, the term of this patent is extended or adjusted under 35 U.S.C. 154(b) by 149 days.

(21) Appl. No.: 17/828,338

(22) Filed: May 31, 2022

(65) Prior Publication Data

US 2023/0388016 A1    Nov. 30, 2023

(51) Int. Cl.
*H04B 10/2575*    (2013.01)
*H04B 10/516*    (2013.01)

(52) U.S. Cl.
CPC ....... *H04B 10/2575* (2013.01); *H04B 10/516* (2013.01)

(58) Field of Classification Search
CPC .......................... H04B 10/2575; H04B 10/516
USPC ........................................................ 398/115
See application file for complete search history.

(56) References Cited

U.S. PATENT DOCUMENTS

| | | | | |
|---|---|---|---|---|
| 6,046,838 | A * | 4/2000 | Kou | G02F 1/0516 |
| | | | | 359/239 |
| 6,687,451 | B1 | 2/2004 | Sikora | |
| 7,184,671 | B2 * | 2/2007 | Wang | H04B 10/503 |
| | | | | 398/198 |
| 7,657,190 | B2 * | 2/2010 | Akiyama | H04B 10/5561 |
| | | | | 398/195 |
| 8,903,239 | B2 * | 12/2014 | Nishimoto | H04B 10/50575 |
| | | | | 398/79 |
| 2003/0175037 | A1 * | 9/2003 | Kimmitt | H04B 10/516 |
| | | | | 398/198 |

(Continued)

FOREIGN PATENT DOCUMENTS

| | | | | |
|---|---|---|---|---|
| CN | 112305787 A | * | 2/2021 | ............. G02F 1/025 |
| JP | 2001257645 A | * | 9/2001 | ........... H04B 10/505 |

(Continued)

OTHER PUBLICATIONS

Li et al; Modulation format free and automatic bias control for optical IQ modulators based on dither correlation detection; Apr. 2017; Optical society of America; pp. 1-13. (Year: 2017).*

(Continued)

*Primary Examiner* — Amritbir K Sandhu
(74) *Attorney, Agent, or Firm* — Duft & Bornsen, PC

(57) ABSTRACT

An apparatus includes an optical device to output a data-modulated optical signal, an electrical radio-frequency (RF) driver to drive the optical device with one or more RF drive signals, a photodetector to provide a measure of a light intensity output by the optical device, and an electronic controller. The electronic controller is configured to dither an amplitude of at least one of the one or more RF drive signals at a dithering frequency. The electronic controller is also configured to adjust one or more operation settings of at least one of the electrical RF driver and the optical device based on a component of the measure of a light intensity at the dithering frequency.

22 Claims, 7 Drawing Sheets

(56) References Cited

U.S. PATENT DOCUMENTS

| | | | |
|---|---|---|---|
| 2003/0210914 A1* | 11/2003 | Khayim | H04B 10/50575 |
| | | | 398/197 |
| 2009/0003840 A1* | 1/2009 | Nahapetian | H04B 10/50575 |
| | | | 398/183 |
| 2009/0232517 A1 | 9/2009 | Farina et al. | |
| 2010/0119239 A1* | 5/2010 | Wang | H04B 10/50575 |
| | | | 398/198 |
| 2018/0267384 A1* | 9/2018 | Padmaraju | G02F 1/225 |
| 2023/0388016 A1* | 11/2023 | Padmaraju | G02F 1/0123 |

FOREIGN PATENT DOCUMENTS

| | | | | |
|---|---|---|---|---|
| WO | 2006105531 A1 | 10/2006 | | |
| WO | WO-2017082349 A1 * | 5/2017 | | G02F 1/0123 |

OTHER PUBLICATIONS

European Search Report; Application EP23175900; Oct. 13, 2023.

\* cited by examiner

OPTIMIZATION OF RF DRIVER AND/OR OPTICAL DEVICE

TECHNICAL FIELD

This disclosure is related to the field of optical communications and, in particular, to optical communications.

BACKGROUND

In high data rate, optical transmission systems, an electro-optical apparatus (e.g., an optical transceiver or optical transmitter) may have a variety of operation settings or parameters that define its operating point. For example, an optical transceiver may comprise a digital signal processor (DSP), a radio frequency (RF) driver, and an optical device, such as an optical modulator. RF drivers include one or more amplifiers and/or biasing circuits that operate based on operation settings, such as supply voltage(s), bias voltage(s), etc. The amplifiers and/or biasing circuits of an RF driver may be sensitive to operating conditions, such as temperature. Also, optical devices may generate or modulate light based on one or more bias voltages, and these optical devices may also be sensitive to operating conditions.

SUMMARY

Some embodiments solve a problem of identifying and improving a suitable operating point for an electro-optical apparatus based on feedback measurements. For example, the improved operating point may be found dynamically, during operation, to enable better operation over a range of time-varying operating conditions.

Various embodiments describe optimization techniques for adjustment of setting(s) of an electro-optical apparatus that includes an electrical driver and an optical device driven thereby and for supporting adjustment of setting(s) of the electrical driver and/or the optical device therein.

In first embodiments, an apparatus includes an optical device to output a data-modulated optical signal, an electrical radio-frequency (RF) driver to drive the optical device with one or more RF drive signals, a photodetector to provide a measure of a light intensity output by the optical device, and an electronic controller. The electronic controller is configured to dither an amplitude of at least one of the one or more RF drive signals at a dithering frequency. The electronic controller is also configured to adjust one or more operation settings of at least one of the electrical RF driver and the optical device based on a component of the measure of a light intensity at the dithering frequency.

In any of the first embodiments, the one or more operation settings may include a gain of the electrical RF driver.

In any of the first embodiments, the one or more operation settings may include a bias voltage of the electrical RF driver or the optical device.

In any of the first embodiments, the one or more operation settings may include a direct-current (DC) voltage output to the optical device by the electrical RF driver.

In any of the first embodiments, the one or more operation settings may include a supply voltage at the electrical RF driver.

In any of the first embodiments, the one or more operation settings may include one or more bias voltages applied at the optical device.

In any of the first embodiments, the electrical controller may be configured to dither a gain of the electrical RF driver.

In some of the first embodiments, the optical device may include an optical modulator. In some such first embodiments, the optical modulator may be a Mach-Zehnder optical modulator. In some special ones of such first embodiments, the Mach-Zehnder optical modulator may be a semiconductor optical modulator, and the one or more operation settings may include a voltage bias across a semiconductor junction along an optical waveguide of the semiconductor optical modulator.

In some of the first embodiments, the optical device may be a nested Mach-Zehnder semiconductor optical modulator, and the one or more operation settings may include voltage biases across semiconductor junctions along optical waveguides of the nested Mach-Zehnder semiconductor optical modulator.

In second embodiments, a method includes driving an optical device with one or more radio frequency (RF) data modulation signals from an electrical RF driver such that at least one of the RF data modulation signals has an amplitude dither at a dithering frequency. The method includes outputting a data-modulated optical signal from the optical device in response to the one or more RF data modulation signals and extracting a frequency component of a measured intensity of the data-modulated optical signal. The frequency component has a frequency of the dithering frequency. The method also includes adjusting one or more operation settings of at least one of the electrical RF driver and the optical device based on the extracted frequency component.

In any of the second embodiments, the adjusting one or more operation settings may include adjusting a gain of the electrical RF driver.

In any of the second embodiments, the adjusting one or more operation settings may include adjusting a supply voltage applied at the electrical RF driver.

In any of the second embodiments, the adjusting one or more operation settings may include adjusting a direct current (DC) voltage output by the electrical RF driver along with one of the one or more RF data modulation signals.

In any of the second embodiments, the adjusting one or more operation settings may include adjusting one or more bias voltages applied at an optical modulator of the optical device. In some such embodiments, the adjusting one or more operation settings may include adjusting a supply voltage applied at the electrical RF driver and/or adjusting a DC voltage output by the electrical RF driver along with one of the one or more RF data modulation signals.

In some of the second embodiments, the optical device may include a semiconductor optical modulator, and the adjusting of one or more operation settings may include adjusting a voltage bias across a semiconductor junction along an optical waveguide of the semiconductor optical modulator. In some such embodiments, the optical device may include a nested Mach-Zehnder semiconductor optical modulator, and the adjusting one or more operation settings may include adjusting voltage biases across semiconductor junctions along optical waveguides of the nested Mach-Zehnder semiconductor modulator.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the claims. The inventive concepts are not limited to the specific embodiments or examples described below, but are defined by the claims and their equivalents.

Figure 1:
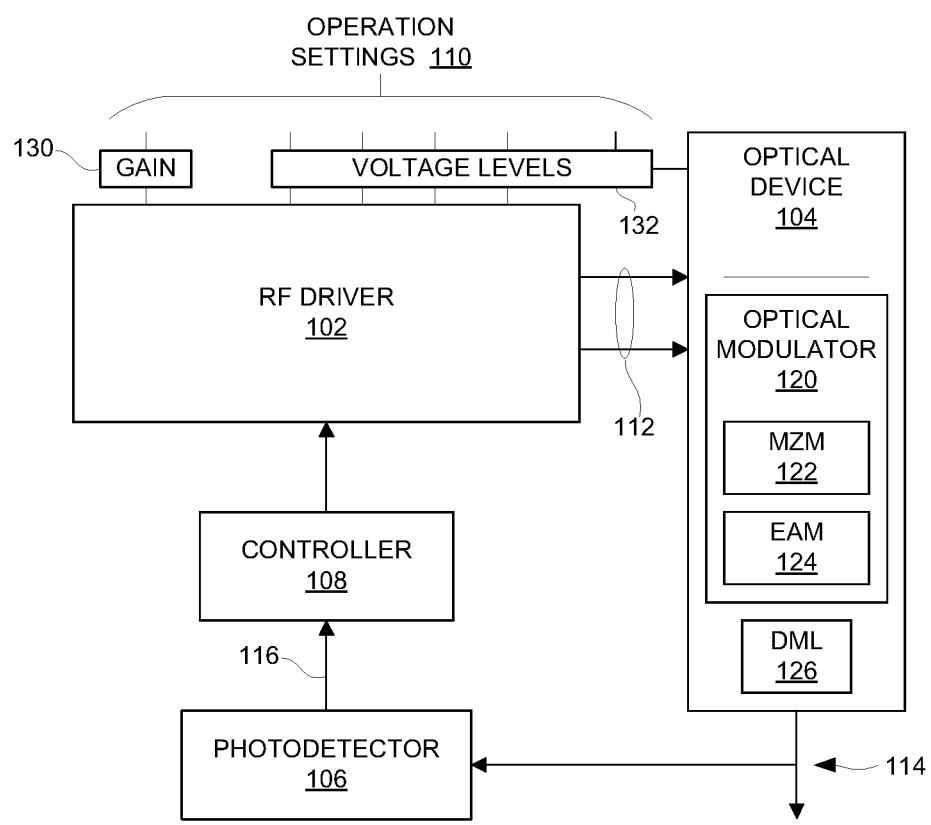
FIG. 1 is a block diagram of an electro-optical apparatus in an illustrative embodiment.

FIG. 1 is a block diagram of an electro-optical apparatus 100 in an illustrative embodiment. Apparatus 100 is configured to at least transmit data via data-modulated optical signals. For example, apparatus 100 may comprise an (e.g., coherent) optical transceiver, an (e.g., coherent) optical transmitter, or another type of optical device. In this embodiment, apparatus 100 includes one or more electrical RF drivers 102, one or more optical devices 104, one or more photodetectors 106, and one or more electronic controllers 108. Electrical RF driver 102 is an electronic device configured to generate one or more RF drive signals 112 that drive optical device 104. Optical device 104 is a type of device that produces a data-modulated optical signal 114 in response to one or more RF drive signals 112, i.e., the RF drive signal(s) carry the data for modulation onto optical signal(s). In one embodiment, optical device 104 may comprise an optical modulator 120, which is a type of device that manipulates optical properties of a light beam, e.g., amplitude and/or phase at points along the beam, in response to the one or more RF drive signals. For example, an optical modulator 120 may comprise a Mach-Zehnder modulator (MZM) 122, an electro-absorption modulator (EAM) 124, or another type of optical modulator, e.g., a nested MZM (e.g., to provide for separate in-phase and quadrature phase modulation of data) or parallel connected pair thereof (e.g., to provide for separate modulation of data onto different polarizations of the output data-modulated optical signal). In another embodiment, optical device 104 may comprise a directly modulatable laser (DML) 126. A DML generates a data-modulated optical signal in response to one or more RF drive signal(s) adjusting an operating point of the laser in a manner that causes the laser to modulate light therein, e.g., by switching between lasing and non-lasing states so that the light carries an optical ON/OFF data-modulation. For these various embodiments of the optical device 104, the RF drive signal(s) carr(ies)/(y) the data stream(s) to be modulated onto an optical signal, e.g., a wavelength carrier, in the optical device 104. However, optical device 104 may comprise other types of optical devices that data-modulate light in response to one or more RF drive signals, which carry the data for modulation. For example, the optical device 104 may be an optical waveguide having one or more optical phases shifters operated by an electrode(s) connected to receive the RF drive signal(s).

In this embodiment, the electrical controller 108 forms a feedback loop that is used to tune or adjust operation settings of electrical RF driver 102 and/or optical device 104, i.e., based on intensity measurements by photodetector 106. Photodetector 106 is connected in apparatus 100 to monitor the data-modulated optical signal 114 output by optical device 104. A photodetector 106 is a device or sensor circuit that converts light intensity into an electrical signal 116. For example, photodetector 106 may include one or more photodiodes that convert light intensity into an electrical current, and optionally a transimpedance amplifier (TIA) that converts the electrical current output of the one or more photodiodes into voltage output. The photodetector 106 may also include an analog-to-digital converter that converts the intensity measurement into a time sequence of said measurements. Electrical controller 108 is an electronic device configured to control operation of the electrical RF driver 102 and/or optical device 104, e.g., via dynamical adjusting operating setting(s) when environmental conditions vary in time. Electrical controller 108 receives the electrical signal 116 from photodetector 106, and feedback controls operation of the electrical RF driver 102 and/or optical device 104 based at least partially on the electrical signal 116. Although electrical controller 108 is shown separate from electrical RF driver 102 in FIG. 1, electrical controller 108 may be integrated with electrical RF driver 102 in other examples.

Electrical RF driver 102 and optical device 104 operate based on one or more operation settings 110 that define an operating point for these two elements of the apparatus 100. For example, one of the operation settings 110 may include a value of a gain control signal 130 at RF driver 102. As will be further described below, RF driver 102 may include one or more amplifiers configured to amplify or boost the amplitude of one or more RF input data modulation signals to produce the RF drive signals 112. A gain control signal 130 therefore sets or adjusts the gain of an amplifier within electrical RF driver 102. In another example, the operation settings 110 may include one or more voltage levels 132. One of the voltage levels 132 may comprise a supply voltage applied to an amplifier at RF driver 102, such as a positive supply voltage (positive rail) and/or a negative supply voltage (negative rail). One of the voltage levels 132 may comprise one or more bias voltages applied within RF driver 102. The value(s) of such bias voltage(s) may affect the amplitude of one or more of the RF drive signals 112 output by the electrical RF driver 102. One of the voltage levels 132 may comprise a bias voltage applied in optical device 104, e.g., a bias voltage across a semiconductor junction of an optical phase shifter, used to data-modulate an optical carrier responsive to the RF drive signal(s). One of the voltage levels 132 may be an about direct-current (DC) offset voltage (e.g., at a frequency, orders of magnitude lower than the baud rate), wherein the DC offset voltage is output to the optical device 104 by the electrical RF driver 102. The operation settings 110 discussed above are examples, and other types of operation settings may be used in various embodiments.

Electrical controller 108 is configured to control one or more of the operation settings 110. For example, electrical controller 108 may supply gain control signal 130 to electrical RF driver 102, and/or may supply or control one or more of the voltage levels 132 in or applied at the electrical RF driver 102. In another example, a gain control circuit and/or one or more voltage sources for the voltage levels 132 may be integrated with electrical RF driver 102, and electrical controller 108 may have a digital interface with electrical RF driver 102 to set or adjust one or more of the operation settings 110.

To tune or adjust the operating point(s) of apparatus 100, the electronic controller 108 dithers an amplitude of one or more of the RF drive signals 112 output by electrical RF driver 102. For example, the electronic controller 108 may dither a gain of the electrical RF driver 102 to cause a small amplitude oscillation, i.e., a dither, on one or more of the RF drive signals 112 at said dithering frequency. The electronic controller 108 also receives measurements of the data-modulated optical signal 114 output by the optical device 104 from photodetector 106. The electrical controller 108 operates to extract a frequency component of said received measurements, i.e., a component at the dithering frequency, e.g., via phase sensitive detection. The electrical controller 108 uses the extracted component of the received measurements of the data-modulated optical signal 114 as a feedback signal for setting or adjusting one or more of the operation settings 110.

In various embodiments, operating properties of the electrical RF driver 102 and optical device 104 typically change at a rate much lower than the data-modulation rate, e.g., multiple orders of magnitude slower. Thus, the operation setting(s) of said devices are typically adjusted or tuned at a rate orders of magnitude slower than the optical symbol rate of the data-modulated optical signal 114 output by optical device 104.

Figure 2:
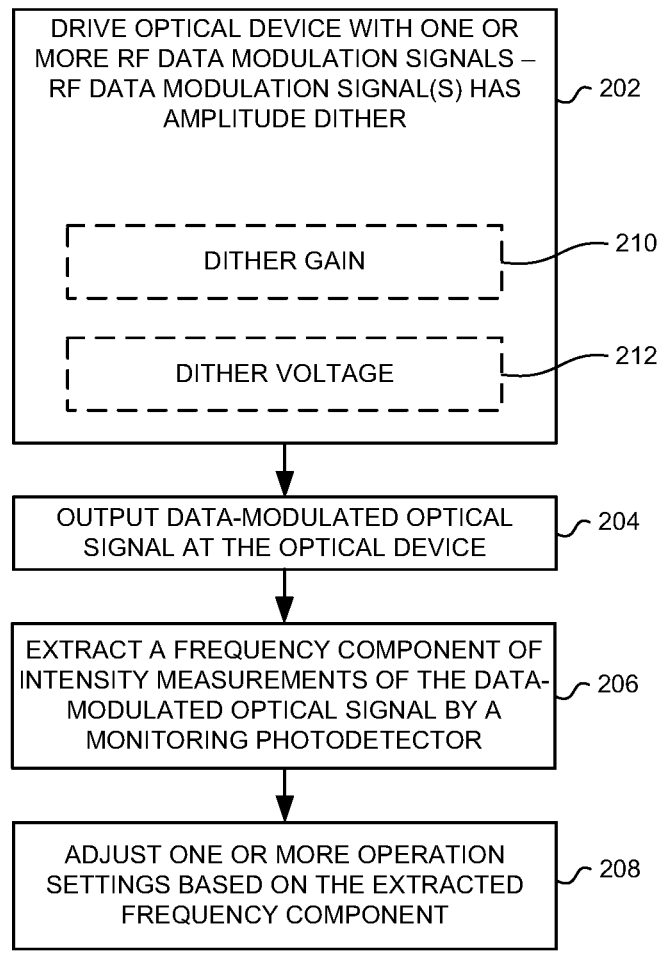
FIGS. 2-4 are flow charts illustrating methods of tuning or adjusting operation setting(s) of an electrical RF driver and/or an optical device in illustrative embodiments.
Figure 3:
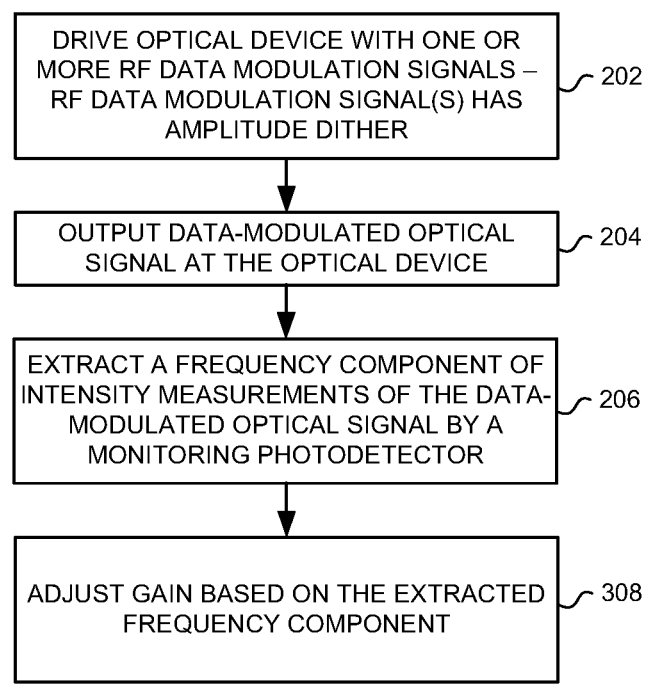
Figure 4:
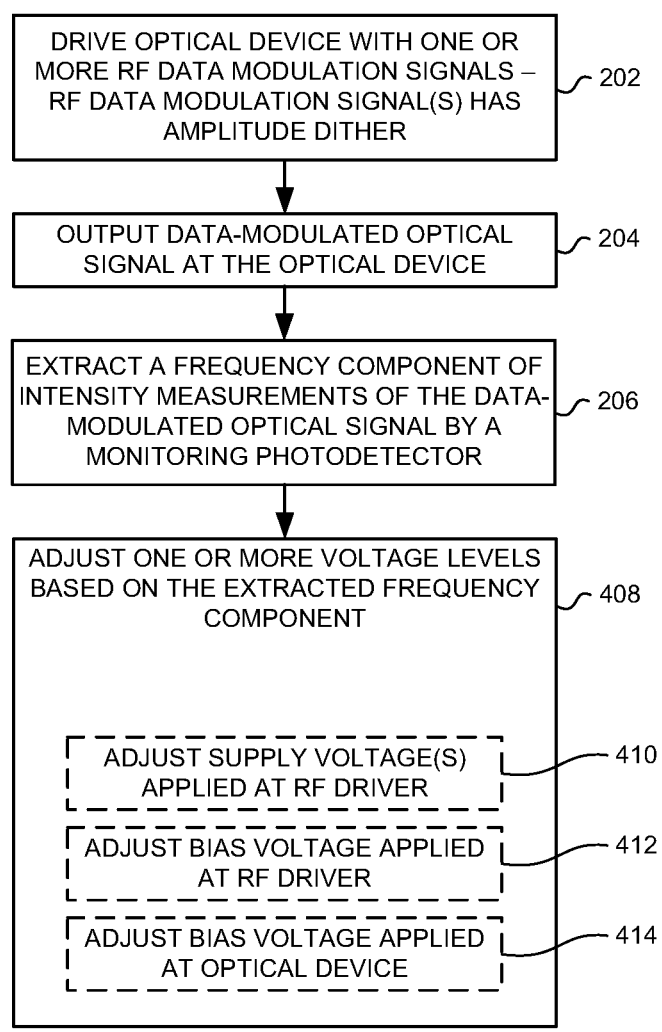

FIGS. 2-4 are flow charts illustrating methods of tuning or adjusting operation setting(s) of electrical RF driver 102 and/or optical device 104 in illustrative embodiments. The steps of the methods in FIGS. 2-4 will be described with reference to apparatus 100 in FIG. 1, but those skilled in the art will appreciate that the methods may be performed in another electro-optical apparatus or device. The steps of the flow charts described herein are not all inclusive and may include other steps not shown, and the steps may be performed in an alternative order.

In method 200 of FIG. 2, electrical RF driver 102 drives optical device 104 with one or more RF data modulation signals 112 (step 202). In this embodiment, one or more of the RF data modulation signals 112 has an amplitude dither, i.e., a small added amplitude modulation, at a dithering frequency. The dithering frequency is much lower than the frequency of RF data-modulation, i.e., is much lower than the baud rate. The manner of amplitude dithering of one or more of the RF data modulation signals 112 may vary. In one embodiment, electrical controller 108 may dither an operation setting 110 at electrical RF driver 102. For example, electrical controller 108 may dither the gain of electrical RF driver 102 (optional step 210). The gain control signal 130 at RF driver 102 is an analog signal, and electrical controller 108 may dither the gain control signal 130 at the dithering frequency so that an RF data modulation signal 112 has such a small amplitude modulation at the dithering frequency. In another example, electrical controller 108 may dither a voltage level 132 at electrical RF driver 102 (optional step 212), such as a supply voltage applied to an amplifier at electrical RF driver 102, a bias voltage applied at electrical RF driver 102, etc. In one embodiment, the dithering signal may be performed digitally. For example, a DSP (not shown in FIG. 1) may be connected to the electrical RF driver 102 to supply one or more RF input data modulation signals to electrical RF driver 102. The DSP may imprint the amplitude dithering on one or more of the RF input data modulation signals, and consequently, one or more of the RF data modulation signals 112 from electrical RF driver 102 will have a small amplitude dither thereon. In such embodiments, a part of the DSP, which causes the amplitude dithering, functions as part of electrical controller 108.

In response to the RF data modulation signals 112 from electrical RF driver 102, optical device 104 outputs data-modulated optical signal 114 (step 204). Because the data-modulated optical signal 114 is generated together with a small amplitude dithering, the data-modulated optical signal 114 also has a small amplitude dither thereon, i.e., at the dithering frequency. The feedback loop of apparatus 100 extracts a frequency component of intensity measurements of the data-modulated optical signal 114 by monitoring photodetector 106 (step 206). For example, a portion or percentage of the data-modulated optical signal 114 (e.g., between 1-3%) may be split off and sent to monitoring photodetector 106, such as with an optical tap (not shown). Photodetector 106 measures a temporal sequence of intensities of the data-modulated optical signal 114, and outputs an electrical signal 116 representing the temporal sequence of measured intensities to electrical controller 108. Electrical controller 108 may then extract the frequency component of said output electrical signal 116 at the dithering frequency. For example, electrical controller 108 may use a phase-sensitive lock-in detector to extract said frequency component at the dithering frequency. Electrical controller 108 adjusts one or more of the operation settings 110 based on the frequency component extracted from the electrical signal 116. That is, electrical controller 108 adjusts operation setting(s) 110 of the electrical RF driver 102 and/or optical device 104 based on the extracted frequency component (step 208).

One technical benefit is method 200 may be repeated periodically to re-adjust or re-tune electrical RF driver 102 and/or optical device 104 in response to time-varying operating conditions, e.g., environmental conditions such as temperature.

In method 300 of FIG. 3, for example, electrical controller 108 may adjust the gain control signal 130 based on a selected frequency component of the light intensity measured at photodetector 106, the selected frequency component having the dithering frequency (step 308). For example, the electrical controller 108 may select said frequency component by using phase-sensitive lock-in detection triggered by the dithering frequency. In method 400 of FIG. 4, for example, electrical controller 108 may adjust one or more of the voltage levels 132 based on said same selected frequency component of the light intensity, which is measured at photodetector 106 (step 408). For example, one of the voltage levels 132 may comprise a supply voltage 514/515 (see FIG. 5) applied to an amplifier of electrical RF driver 102. Thus, electrical controller 108 may adjust one or more of the supply voltages 514/515 based on said selected frequency component of the light intensity measurements at photodetector 106 (step 410). In another example, one of the voltage levels 132 may comprise a bias voltage 516 (see FIG. 5) applied to electrical RF driver 102 to adjust the swing of one or more of the RF data modulation signals 112. Thus, electrical controller 108 may adjust the bias voltage 516 based on the above-mentioned selected frequency component of the light intensity measurements at photodetector 106 (step 412). In another example, the voltage levels 132 may comprise one or more bias voltages 640 (see FIG. 6) applied at optical device 104. Thus, electrical controller 108 may adjust the bias voltage(s) 640 based on the same selected component of the light intensity measured at photodetector 106, i.e., the component at the dithering frequency (step 414).

Figure 5:
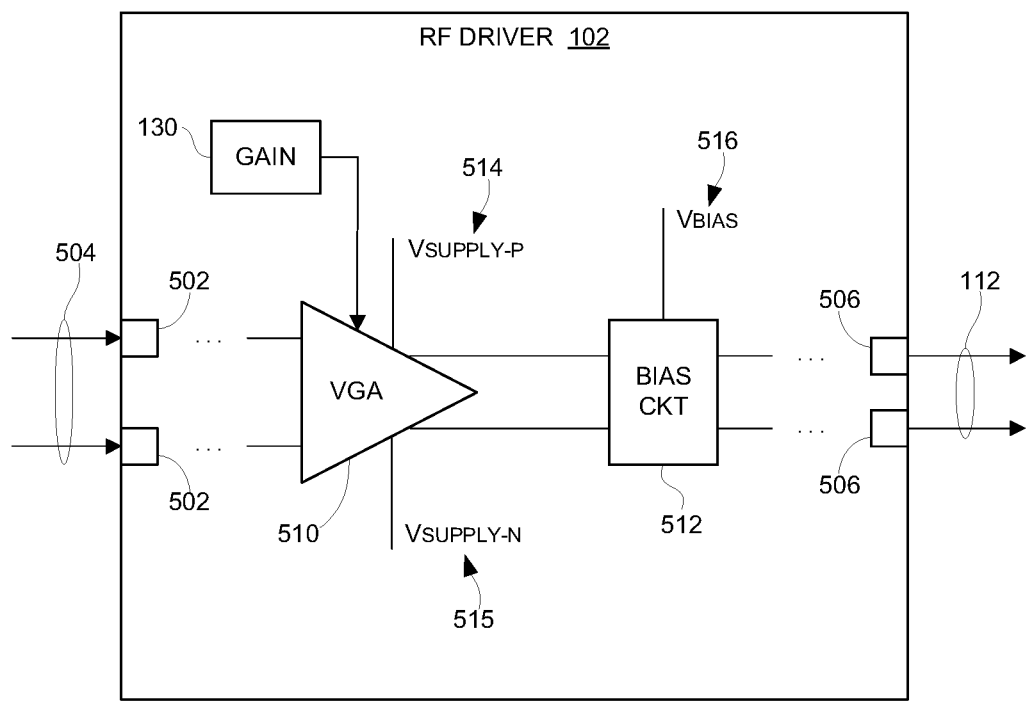
FIG. 5 is a block diagram of an electrical RF driver in an illustrative embodiment.

FIG. 5 is a block diagram of electrical RF driver 102 in an illustrative embodiment. In this embodiment, RF driver 102 includes one or more RF input ports 502 configured to receive one or more RF input data modulation signals 504, such as from a DSP. RF driver 102 also includes one or more RF output ports 506 configured to output one or more RF data modulation signals 112, i.e., the RF drive signals. Between RF input ports 502 and RF output ports 506, RF driver 102 includes one or more variable-gain amplifiers (VGA) 510 and a biasing circuit 512. VGA 510 is a type of amplifier that has an adjustable gain. VGA 510 has multiple operation settings 110 that may be adjusted by electrical controller 108. For example, the gain of VGA 510 may be adjusted via gain control signal 130, and electrical controller 108 may tune the gain control signal 130 as desired. Other operation settings 110 of VGA 510 are a positive supply voltage 514 ($V_{supply-P}$) and a negative supply voltage 515 ($V_{supply-N}$), one or both of which may be tuned by electrical controller 108. Biasing circuit 512 is configured to adjust a time-averaged voltage level (i.e., an approximately DC voltage) of the one or more RF data modulation signals 112 output by the electrical RF driver 102. Biasing circuit 512 also has an operation setting 110 that may be tuned by electrical controller 108, which is the bias voltage 516 (Vbias). Electrical RF driver 102 may include additional elements that are not shown in FIG. 5 for the sake of brevity, such as a buffer.

Figure 6:
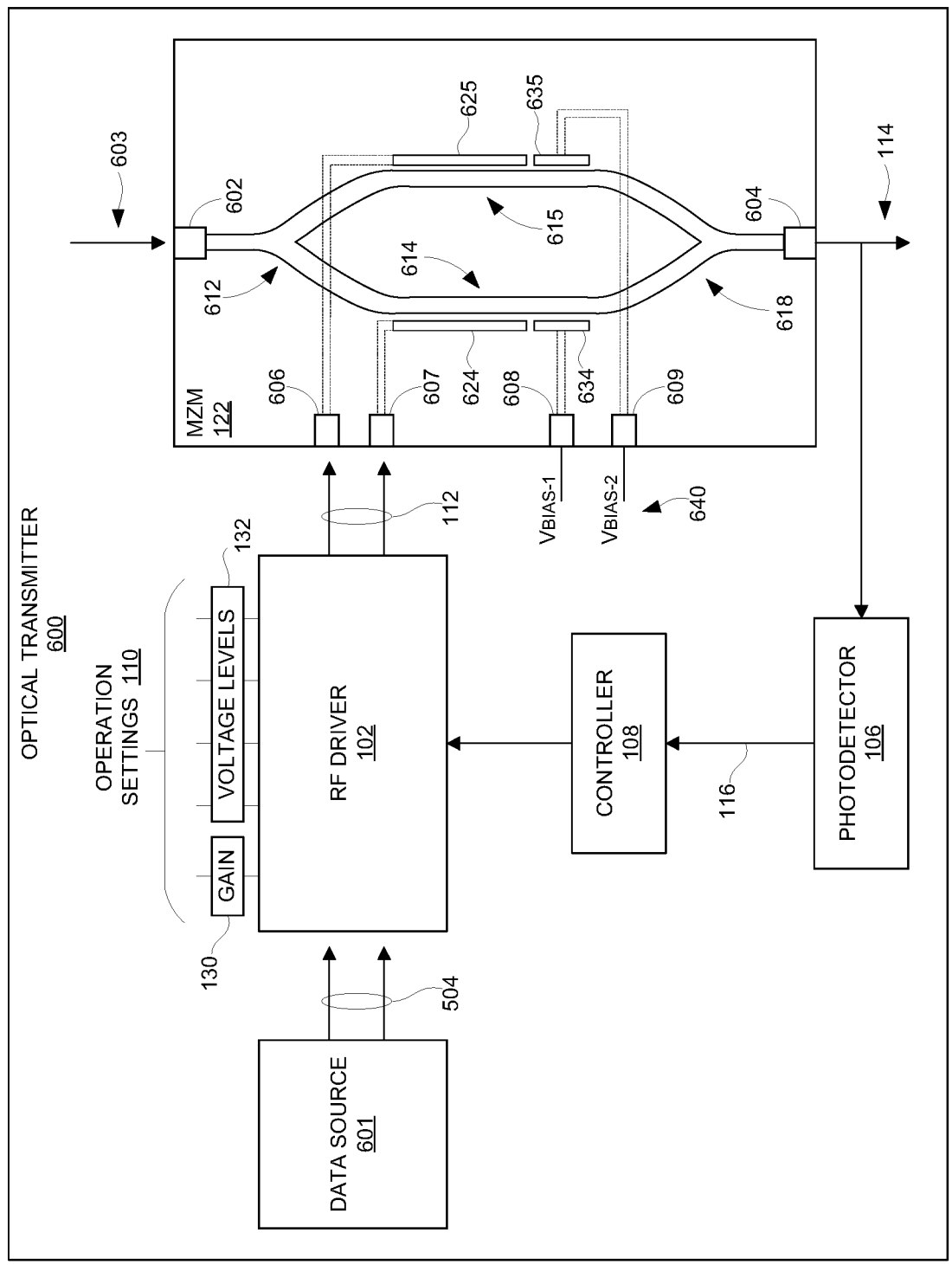
FIG. 6 is a block diagram of an optical transmitter in an illustrative embodiment.

FIG. 6 is a block diagram of an (e.g., coherent) optical transmitter 600 in an illustrative embodiment. In this embodiment, optical transmitter 600 includes a digital data source 601 (e.g., DSP), one or more electrical RF drivers 102, one or more opto-electrical Mach-Zehnder Modulators (MZM) 122, one or more monitoring photodetectors 106, and one or more electrical controllers 108. Each MZM 122 includes one or more optical input ports 602 configured to receive optical input 603, and one or more optical output ports 604 configured to output a data-modulated optical signal 114. Each MZM 122 further includes one or more RF input ports 606-607 configured to receive one or more RF data modulation signals 112, i.e., RF drive signals, from electrical RF driver 102. Each MZM 122 may further include one or more bias voltage pins 608-609.

Each MZM 122 includes an optical power splitter 612, a pair of parallelly-connected first and second optical arms 614-615, and an optical power combiner 618. An optical carrier input 603 received at optical input port 602 is split at optical power splitter 612 to be shared by first optical arm 614 and second optical arm 615 (e.g., the power splitting may cause about equal amounts of the light from optical input port 602 to be directed to each of the optical arms 614 and 615). One or both of the optical arms 614-615 has a data-modulation segment there along, which includes an optical phase shifter electrically connected to be driven by a corresponding one or more RF data modulation signals 112, i.e., RF drive signal(s). In the MZM 122 illustrated in FIG. 6, both optical arms 614-615 have such a data-modulation segment. Thus, the illustrated MZM 122 includes an RF electrode 624 disposed along the segment of first optical arm 614 so that the segment is an optical phase shifter for data-modulation, and an RF electrode 625 disposed along the segment of second optical arm 615 so that the segment is also an optical phase shifter for data-modulation. Each RF electrode 624-624 may be, e.g., an RF traveling wave electrode with single or multiple electrical connections near to and along the corresponding optical arm 614-615. RF electrode 624 is electrically connected to RF input port 606, e.g., by a metallic trace. RF electrode 625 is electrically connected to RF input port 607, e.g., by a metallic trace. MZM 122 further includes a DC bias electrode 634 disposed along optical modulation arm 614, and a DC bias electrode 635 disposed along optical modulation arm 615. DC bias electrode 634 is electrically connected to bias voltage pin 608, e.g., by a metallic trace. DC bias electrode 635 is electrically connected to bias voltage pin 609, e.g., by a metallic trace.

An RF data modulation signal 112 guided along RF electrode 624 alters the refractive index of the nearby segment of the corresponding first optical arm 614 and thus, changes a phase shift accumulated by light approximately co-propagating there along. Similarly, an RF data modulation signal 112 guided along RF electrode 625 alters the refractive index of the corresponding second modulation arm 615 and thus, changes a phase shift accumulated by the light approximately co-propagating there along. In embodiments where one or both of the parallel optical arms 614-615 have a semiconductor junction therein, the bias voltages 640 applied to DC bias electrode 634-635 may set an electrical operation property of said junction(s), e.g., to be reverse biased junctions. Optical power combiner 618 combines the light from the two parallel optical arms 614-615. In the optical power combiner 618, the light from the two parallel optical arms 614-615 may constructively or destructively interfere depending on an accumulated phase difference between the light from the different optical arms 614-615. Due to the interference in the optical power combiner 618, the relative phase difference between said light results in an amplitude and/or phase modulation of the optical signal 114 at optical output port 604.

In operation, data source 601 provides one or more input digital data streams 504 to electrical RF driver 102, and electrical RF driver 102 converts the input digital data streams 504 to the RF data modulation signals 112, i.e., the RF drive signals. As in FIG. 2, electrical RF driver 102 drives MZM 122 with RF data modulation signals 112 (step 202). In addition, the RF data modulation signal(s) 112 has(have) an additional small amplitude dithering during periods in which feedback is generated for adjusting the operation setting(s) 110 of the electrical RF driver 102 and/or opto-electrical MZM 122. In response to the RF data modulation signals 112 from electrical RF driver 102, opto-electrical MZM 122 outputs a data-modulated optical signal 114 (step 204) as described above. Photodetector 106 monitors the optical signal 114 output by the electro-optical MZM 122 (step 206). More particularly, photodetector 106 measures a light intensity of the optical output 114, e.g., at a series of time, and the photodetector 106, or electrical apparatus connected thereto, may transmit electrical signal 116, representative of said measurement to electrical controller 108. Electrical controller 108 may then extract the component of the electrical signal 116 at the dithering frequency, e.g., via phase-sensitive lock-in detection with respect to dithering frequency. Electrical controller 108 adjusts one or more operation settings 110 based on a selected frequency component extracted from the light intensity measurements at photodetector 106, wherein the selected frequency component has the dithering frequency (step 208). For example, electrical controller 108 may adjust the gain control signal 130, a supply voltage 514/515, a bias voltage 516 at electrical RF driver 102, and/or an approximate DC offset of one or more of the RF drive signals and/or may adjust bias voltage(s) 640 applied at MZM 122, and/or adjust other operation settings 110.

FIG. 6 illustrates optical device 104 of FIG. 1 as including a single MZM 122. In specific embodiments, the optical device 104 may include, e.g., a nested MZM, with multiple parallel connected MZMs. Such a nested MZM can support, e.g., separate in-phase and quadrature phase modulation of data or higher order modulation formats. Also, the optical device 104 may include a parallel connected pair of such nested MZMs (e.g., to provide for separate modulation of data onto in-phase and quadrature phase components of two orthogonal polarizations of an optical wavelength carrier). Indeed, some such optical modulators may be semiconductor optical modulators having semiconductor junctions in and along data-modulation segments of one or more parallel-connected optical arms thereof. In such embodiments, the operation settings 110, which are feedback adjusted in various embodiments herein based on amplitude dithering of RF drive signals, may include the DC bias voltage(s) applied across said semiconductor junction(s), e.g., said voltages typically provide reverse biasing, but the specific biasing voltage values may affect the operational performance of such optical modulators and thus, may benefit from methods and apparatus for tuning and adjustment as described herein.

Figure 7:
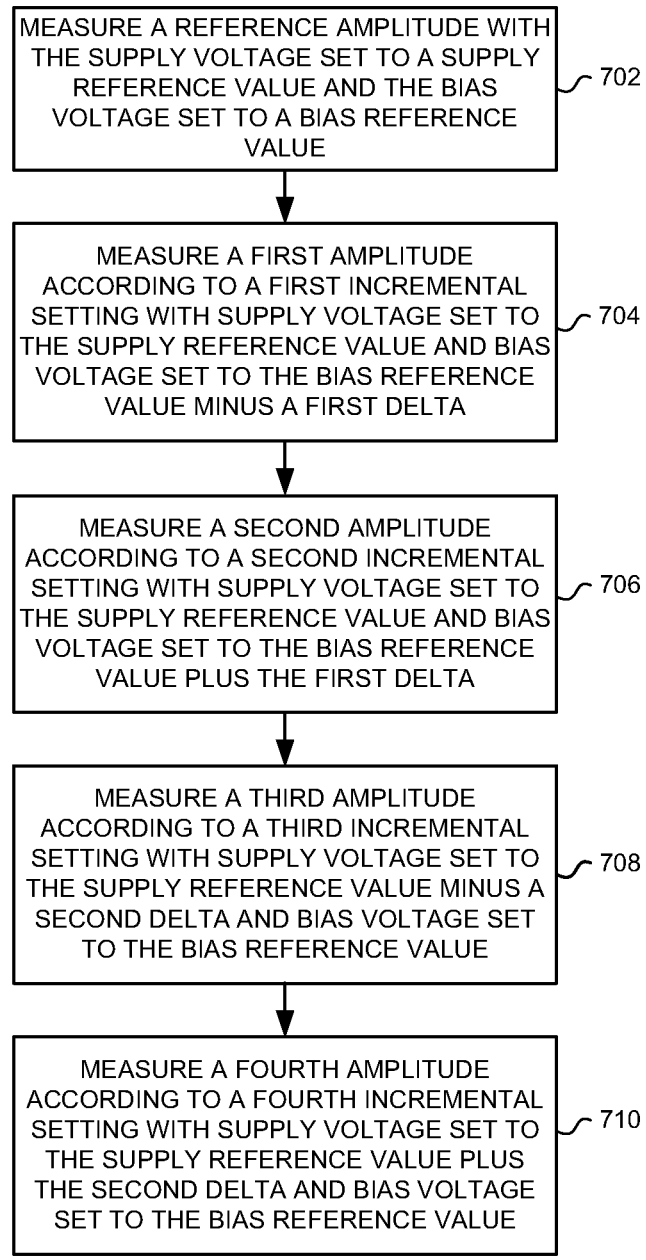
FIG. 7 is a flow chart illustrating a method of tuning or adjusting an electrical RF driver in an illustrative embodiment.

FIG. 7 is a flow chart illustrating a method of tuning or adjusting electrical RF driver 102 in an illustrative embodiment. Method 700 represents an adjustment process that may be performed, e.g., periodically or continuously to identify better or even optimal operation settings 110 at electrical RF driver 102. Typically, the RF driver bias should typically be about in the middle of the supply voltages 514-515 to allow the electrical RF driver 102 to operate at full swing. The electrical RF driver bias depends on the supply voltages 514-515, and the bias voltage 516. Optimal voltage settings for the supply voltages 514-515 and the bias voltage 516 are usually temperature dependent, so there typically isn't one setting that delivers optimal driver performance over the operating temperature range of electrical RF driver 102. Thus, active adjustment of supply voltages 514-515 and the bias voltage 516 may be performed using the tuning or adjustment process. In the tuning or adjustment process described below, the negative supply voltage 515 is adjusted along with the bias voltage 516, but similar concepts could apply for the positive supply voltage 514 or other operation settings 110.

In FIG. 7, electrical controller 108 compares measurements to reference operation settings for electrical RF driver 102, i.e., for supply voltage 515 and bias voltage 516. With respect to the reference operation settings, electrical controller 108 sets supply voltage 515 to a supply reference value and sets the bias voltage 516 to a bias reference value. RF driver 102 supplies optical device 104 with the RF data modulation signals 112 having slightly dithered amplitude(s). For example, electrical controller 108 may make a small dither of the gain control signal 130, e.g., to superimpose a small amplitude dither on the RF data modulation signal(s) 112 to produce feedback for adjusting said operation setting(s). Then, photodetector 106 measures an intensity for data-modulated optical signal(s) 114 output by optical device 104, and electrical controller 108 extracts a selected frequency component of each measured intensity, i.e., a frequency component selected at the dithering frequency. Electrical controller 108 measures a reference amplitude of said selected frequency component, at the dithering frequency, when the supply voltage 515 is set to the supply reference value and the bias voltage 516 is set to the bias reference value (step 702).

With the reference amplitude obtained for said selected frequency component at the dithering frequency, electrical controller 108 performs additional measurements with slight adjustments to supply voltage 515 and/or bias voltage 516.

In particular, electrical controller 108 performs a measurement using a first increment to the reference settings, for which supply voltage 515 is set to the supply reference value, and the bias voltage 516 is set to the bias reference value minus a first delta. RF driver 102 supplies optical device 104 with the RF data modulation signals 112, wherein one or more of the RF data modulation signals 112 has(have) small added amplitude modulation due to dithering. Photodetector 106 measures a light intensity of the data-modulated optical signal 114 output from optical device 104, and electrical controller 108 extracts a selected frequency component of the measured intensity, i.e., a frequency component at the dithering frequency. Electrical controller 108 measures a first amplitude of the said selected frequency component, when the supply voltage 515 is set to the supply reference value, and the bias voltage 516 is set to the bias reference value minus the first delta (step 704).

Electrical controller 108 performs another measurement using a second increment to the reference settings, in which supply voltage 515 is set to the supply reference value, and the bias voltage 516 is set to the bias reference value plus the first delta. RF driver 102 supplies optical device 104 with the RF data modulation signal(s) 112, while one or more of the RF data modulation signals 112 has(have) a small added amplitude modulation due to dithering. Photodetector 106 again measures light intensity of the data-modulated optical signal 114 output from optical device 104, and electrical controller 108 extracts a selected frequency component of the measured intensity, i.e., a frequency component selected at the dithering frequency. Electrical controller 108 measures a second amplitude of the selected frequency component with the supply voltage 515 set to the supply reference value and the bias voltage 516 set to the bias reference value plus the first delta (step 706).

Electrical controller 108 performs another measurement using a third increment to the reference settings, for which supply voltage 515 is set to the supply reference value minus a second delta, and the bias voltage 516 is set to the bias reference value. RF driver 102 supplies optical device 104 with the RF data modulation signals 112, and one or more of the RF data modulation signals 112 has a small added amplitude modulation due to dithering. Photodetector 106 again makes a light intensity measurement of the data-modulated optical signal 114 output from optical device 104, and electrical controller 108 extracts a selected frequency component, at the dithering frequency, of the light intensity measurement. Electrical controller 108 measures a third amplitude of said selected frequency component, when the supply voltage 515 set to the supply reference value minus the second delta, and the bias voltage 516 is set to the bias reference value (step 708).

Electrical controller 108 performs another measurement using a fourth increment to the reference settings, for which supply voltage 515 is set to the supply reference value plus the second delta, and the bias voltage 516 is set to the bias reference value. Electrical RF driver 102 supplies optical device 104 with the RF data modulation signals 112, and one or more of the RF data modulation signals 112 again has a small added amplitude dither. Photodetector 106 makes a light intensity measurement of the data-modulated optical signal 114 output from optical device 104, and electrical controller 108 extracts a selected frequency component of the light intensity measurement, i.e., the frequency component at the dithering frequency. Electrical controller 108 measures a fourth amplitude of the said selected frequency component, when the supply voltage 515 is set to the supply reference value plus the second delta, and the bias voltage 516 is set to the bias reference value (step 710).

Additional measurements may be performed with other increments to the reference settings as desired in various embodiments.

In various embodiments, the size of the frequency component of the measured intensities of the data-modulated optical signal 114 for optical device 104, at the dithering frequency, are expected to be largest when the control or operation settings 110 are better selected or about optimized. This expectation is believed to be useful in guiding procedures for incrementally adjusting said operation settings 110 based on feedback of said light intensity measurements to arrive at better operation settings for the electrical RF driver 102 and/or the optical device 104.

For the next iteration of the tuning process, step 702 of FIG. 7 may be omitted as the present setting may be used as the reference setting.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, hard drives, or optically readable digital data storage media.

As used in this application, the term "circuitry" may refer to one or more or all of the following:
(a) hardware-only circuit implementations (such as implementations in only analog and/or digital circuitry);
(b) combinations of hardware circuits and software, such as (as applicable):
(i) a combination of analog and/or digital hardware circuit(s) with software/firmware; and
(ii) any portions of hardware processor(s) with software (including digital signal processor(s)), software, and memory(ies) that work together to cause an apparatus to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

Although specific embodiments were described herein, the scope of the disclosure is not limited to those specific embodiments. The scope of the disclosure is defined by the following claims and any equivalents thereof.

What is claimed is:

1. An apparatus comprising:
an optical device to output a data-modulated optical signal;
an electrical radio-frequency (RF) driver to drive the optical device with one or more RF drive signals;
a photodetector to provide a measure of a light intensity output by the optical device; and
an electronic controller to dither an amplitude of at least one of the one or more RF drive signals at a dithering frequency, and to control operation of the electrical RF driver by adjusting one or more supply voltages applied to an amplifier at the electrical RF driver based on a component of the measure of a light intensity at the dithering frequency.

2. The apparatus of claim 1, wherein:
the electronic controller is configured to control operation of the electrical RF driver by adjusting a gain of the amplifier.

3. The apparatus of claim 1, wherein:
the electronic controller is configured to control operation of the electrical RF driver by adjusting a bias voltage of the electrical RF driver.

4. The apparatus of claim 1, wherein:
the one or more supply voltages comprises a positive supply voltage.

5. The apparatus of claim 1, wherein:
the one or more supply voltages comprises a negative supply voltage.

6. The apparatus of claim 1, wherein:
the electrical controller is configured to dither at least one of the one or more supply voltages.

7. The apparatus of claim 1, wherein:
the electrical controller is configured to dither a gain of the electrical RF driver.

8. The apparatus of claim 1, wherein:
the optical device comprises an optical modulator.

9. The apparatus of claim 8, wherein:
the optical modulator comprises a Mach-Zehnder optical modulator.

10. A method comprising:
driving an optical device with one or more radio frequency (RF) data modulation signals from an electrical RF driver such that at least one of the RF data modulation signals has an amplitude dither at a dithering frequency;
outputting a data-modulated optical signal from the optical device in response to the one or more RF data modulation signals;
extracting a frequency component of a measured intensity of the data-modulated optical signal, the frequency component having a frequency of the dithering frequency; and controlling operation of the electrical RF driver by adjusting one or more supply voltages applied to an amplifier at the electrical RF driver based on the extracted frequency component.

11. The method of claim 10, wherein:
the controlling comprises adjusting a gain of the amplifier.

12. The method of claim 10, wherein:
the controlling comprises adjusting a bias voltage of the electrical RF driver.

13. The method of claim 10, wherein:
the one or more supply voltages comprises a positive supply voltage.

14. The method of claim 10, wherein:
the one or more supply voltages comprises a negative supply voltage.

15. The method of claim 10, wherein:
the driving the optical device with the one or more RF data modulation signals comprises dithering a gain of the electrical RF driver such that the at least one of the RF data modulation signals has the amplitude dither at the dithering frequency.

16. The method of claim 10, wherein:
the driving the optical device with the one or more RF data modulation signals comprises dithering at least one of the one or more supply voltages such that the at least one of the RF data modulation signals has the amplitude dither at the dithering frequency.

17. An apparatus comprising:
an optical device to output a data-modulated optical signal;
an electrical radio-frequency (RF) driver to drive the optical device with one or more RF drive signals;
a photodetector to provide a measure of a light intensity output by the optical device; and
an electronic controller to dither an amplitude of at least one of the one or more RF drive signals at a dithering frequency, and to control operation of the electrical RF driver by adjusting a bias voltage of the electrical RF driver based on a component of the measure of a light intensity at the dithering frequency.

18. The apparatus of claim 17, wherein:
the electronic controller is configured to control operation of the electrical RF driver by adjusting one or more supply voltages applied to an amplifier at the electrical RF driver.

19. The apparatus of claim 17, wherein:
the electronic controller is configured to control operation of the electrical RF driver by adjusting a gain of an amplifier at the electrical RF driver.

20. A method comprising:
driving an optical device with one or more radio frequency (RF) data modulation signals from an electrical RF driver such that at least one of the RF data modulation signals has an amplitude dither at a dithering frequency;
outputting a data-modulated optical signal from the optical device in response to the one or more RF data modulation signals;
extracting a frequency component of a measured intensity of the data-modulated optical signal, the frequency component having a frequency of the dithering frequency; and
controlling operation of the electrical RF driver by adjusting a bias voltage of the electrical RF driver based on the extracted frequency component.

21. The method of claim 20, wherein:
the controlling comprises adjusting one or more supply voltages applied to an amplifier at the electrical RF driver.

22. The method of claim 20, wherein:
the controlling comprises adjusting a gain of an amplifier at the electrical RF driver.

* * * * *